US012767220B2

(12) United States Patent
Cao et al.

(10) Patent No.: US 12,767,220 B2
(45) Date of Patent: Oct. 20, 2026

(54) STARTUP PROCEDURE FOR STEER-BY-WIRE SYSTEMS WITH SPRING-TO-CENTER STEERING WHEELS

(71) Applicant: Ford Global Technologies, LLC, Dearborn, MI (US)

(72) Inventors: Bang Kim Cao, Northville, MI (US); Jonathan Craig Sullivan, Ferndale, MI (US); Matthew Meyerholtz Johnson, Toledo, OH (US); David Gon Oh, Canton, MI (US); Sage Aaron Stubbs, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 7 days.

(21) Appl. No.: 19/084,307

(22) Filed: Mar. 19, 2025

(65) Prior Publication Data

US 2026/0285398 A1 Sep. 24, 2026

(51) Int. Cl.
*B62D 6/00* (2006.01)
*B62D 1/04* (2006.01)
*B62D 5/04* (2006.01)

(52) U.S. Cl.
CPC ............. *B62D 6/008* (2013.01); *B62D 1/046* (2013.01); *B62D 5/0466* (2013.01)

(58) Field of Classification Search
CPC ....... B62D 5/0466; B62D 6/008; B62D 1/046
See application file for complete search history.

(56) References Cited

U.S. PATENT DOCUMENTS

| | | | | |
|---|---|---|---|---|
| 10,442,459 B2 | 10/2019 | Siskoy et al. | | |
| 11,685,431 B2 | 6/2023 | Al Assad et al. | | |
| 2003/0088351 A1* | 5/2003 | Augustine | B62D 6/008 | 180/443 |
| 2004/0167693 A1* | 8/2004 | Yao | B62D 5/001 | 180/443 |
| 2004/0236487 A1* | 11/2004 | Yao | B62D 6/002 | 180/443 |
| 2022/0144295 A1* | 5/2022 | Hwang | B62D 6/008 | |
| 2024/0278825 A1* | 8/2024 | Hansson | B62D 5/0466 | |

FOREIGN PATENT DOCUMENTS

EP 1512609 B1 3/2015

* cited by examiner

*Primary Examiner* — Sizo B Vilakazi
(74) *Attorney, Agent, or Firm* — Lorne Forsythe; Hanley, Flight & Zimmerman, LLC

(57) ABSTRACT

Startup procedures for steer-by-wire systems with spring-to-center steering wheels are disclosed. An example vehicle control system includes a wheel angle sensor to determine a wheel angle of a road wheel of a vehicle, a steering wheel torque sensor to determine a commanded wheel angle of a steering wheel of the vehicle, and a controller with at least one processing unit configured to, at vehicle startup, compare the commanded wheel angle to the wheel angle, and based on a determination that the commanded wheel angle and wheel angle are different, prevent motion of the vehicle.

20 Claims, 6 Drawing Sheets

STARTUP PROCEDURE FOR STEER-BY-WIRE SYSTEMS WITH SPRING-TO-CENTER STEERING WHEELS

FIELD OF THE DISCLOSURE

This disclosure relates generally to electric steering systems and, more particularly, to a startup procedure for standstill electric steering systems.

BACKGROUND

A steer-by-wire system equipped with a fixed steering wheel, a steering wheel with small angular displacement for a steer-by-wire system, or a spring-to-center steering wheel can offer a unique experience for driving a vehicle. In particular, a road wheel actuator (RWA) controls movement of a steering rack while the steering wheel provides a commanded steering angle through a torque sensor to the RWA. In a conventional steering system, the steering wheel can remain in an angular orientation upon being released by the driver when the vehicle is stopped and, thus, the wheels of the vehicle remain stationary.

SUMMARY

An example vehicle control system includes a wheel angle sensor to determine a road wheel angle of a wheel of a vehicle, a steering wheel torque sensor to determine a commanded wheel angle of a steering wheel of the vehicle, and a controller with at least one processing unit configured to, at vehicle startup, compare the commanded wheel angle to the wheel angle, and based on a determination that the commanded wheel angle and the wheel angle are different, prevent motion of the vehicle.

An example steering control system for a vehicle includes a steering motor operatively coupled to a steering motor position sensor to determine a steering motor position, a steering wheel operatively coupled to a steering wheel torque sensor to determine a commanded steering motor position, and at least one processing unit configured to provide an indication of the steering motor position and the commanded steering motor position to a display, on startup, compare the steering motor position and the commanded steering motor position, based on a determination that the steering motor position and the commanded steering motor position are different, prevent motion of the vehicle, and generate a request to synchronize the commanded steering motor position and the steering motor position, and based on an input, synchronize the commanded steering motor position and the steering motor position and enable motion of the vehicle.

An example method for an electronic steering system includes determining a wheel angle of a road wheel, determining a commanded wheel angle of a steering wheel using a torque sensor, generating a notification of the wheel angle and the commanded wheel angle to a display, and comparing the wheel angle and the commanded wheel angle, wherein if the wheel angle and the commanded wheel angle are different, preventing motion of a vehicle.

Figure 1:
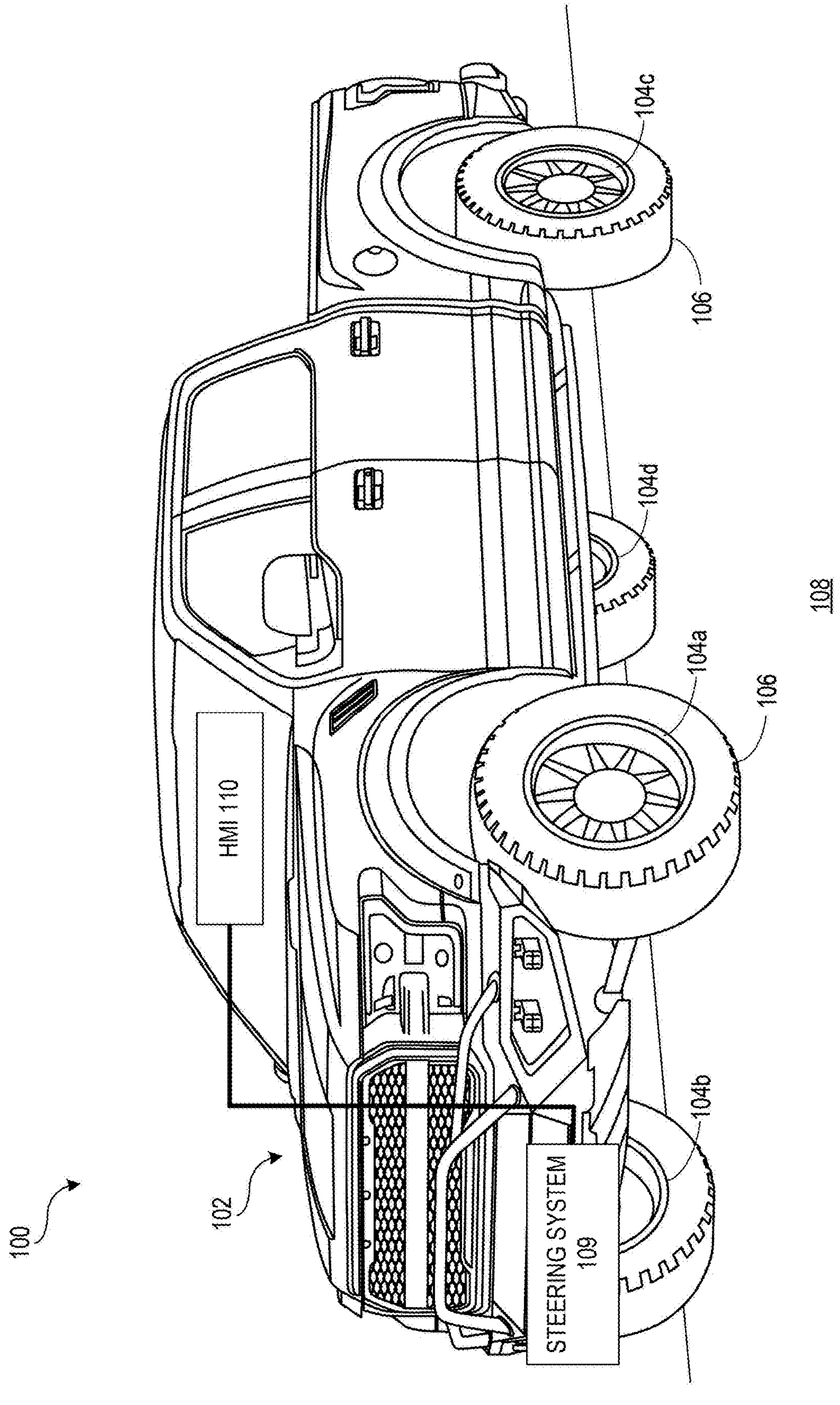
FIG. 1 illustrates an example vehicle in which examples disclosed herein can be implemented.

In general, the same reference numbers will be used throughout the drawing(s) and accompanying written description to refer to the same or like parts. The figures are not necessarily to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

DETAILED DESCRIPTION

Steer-by-wire systems of a vehicle typically utilize a road wheel actuator (RWA) that controls movement of a steering actuator while a hand wheel actuator (HWA) receives input from a user and, in turn, provides feedback to the user. The feedback can include, but is not limited to, a rotational resistance and/or torque via a steering wheel. Steer-by-wire systems are distinct from conventional steering systems such that the RWA and the HWA are coordinated and/or operated together based on software and/or hardware logic.

Vehicles utilizing steer-by-wire systems with spring-to-center steering wheels typically do not include HWAs and measure an applied torque of the steering wheel without allowing or only allowing a small rotational movement of the steering wheel. Not allowing rotational movement or only allowing a small rotational movement of the steering wheel affects the startup procedure of the system. For example, a user may want to park a vehicle with a spring-to-center steering wheel on a hill. When the user parks the vehicle, they may apply torque to the steering wheel, which creates a commanded wheel angle to instruct the RWA to turn the road wheels in a direction of a curb. The user then locks this position by providing input to the spring-to-center steering wheel and powers down the vehicle. However, when the user powers the vehicle on, there may be a difference between the commanded steering angle and the position of the RWA.

Examples disclosed herein can prevent a mismatch between the commanded steering angle and the position of the RWA on startup of a steer-by-wire system with a spring-to-center steering wheel. Examples disclosed herein enable a steering system with at least one processing unit configured to, at vehicle startup, compare a commanded wheel angle and a position of the RWA, and based on a determination that the commanded wheel angle and the position of the RWA are different, prevent motion of the vehicle. Preventing the motion of the vehicle can include preventing motion of the RWA and preventing rotational motion of the wheels. An example steering system includes a wheel angle sensor to determine a wheel angle of the vehicle corresponding to the position of the RWA. Further, the steering system includes a steering wheel torque sensor to determine the commanded wheel angle of a steering wheel of the vehicle corresponding to torque applied to the steering wheel. Disclosed examples prevent motion of the vehicle until the commanded steering angle and the position of the RWA substantially match or are substantially equal. As used herein, substantially matching and substantially equal means value that are within ±10% of each other.

Examples disclosed herein, after determining a difference between the commanded wheel angle and the position of the RWA, prompt the user to input a torque to the steering wheel so that the commanded wheel angle and the position of the RWA match. In some examples, the steering system accepts an input from the user to synchronize the commanded wheel angle and the position of the RWA. To that end, in response to such an input, the steering system changes the position of the RWA to match the commanded wheel angle. After the commanded wheel angle and position of the RWA match, or at least substantially match, the steering system enables motion of the vehicle.

A prompt to a user may include a human machine interface (HMI) such as a display having an array of light sources. Such a display may be utilized to convey information to the user corresponding to the position of the RWA and/or whether the commanded wheel angle is different from the position of the RWA. The HMI may include a linearly arranged grouping of light emitting diodes (LEDs), for example. In some examples, the HMI includes a panel display (e.g., a screen panel, etc.). Additionally or alternatively, haptic feedback, such as vibration of a steering wheel, is utilized to convey whether the commanded wheel angle and the position of the RWA match.

FIG. 1 illustrates an example vehicle 100 in which examples disclosed herein can be implemented. The vehicle 100 of the illustrated example includes a body 102 and a plurality of wheels 104 to which tires 106 are coupled. As shown, the vehicle 100 has two front wheels 104*a* and 104*b* and two rear wheels 104*c* and 104*d*. In turn, the tires 106 are in contact with a road surface 108. The example vehicle 100 further includes a steering system 109 and an HMI 110 (e.g., a user interface, a display, etc.).

Figure 2:
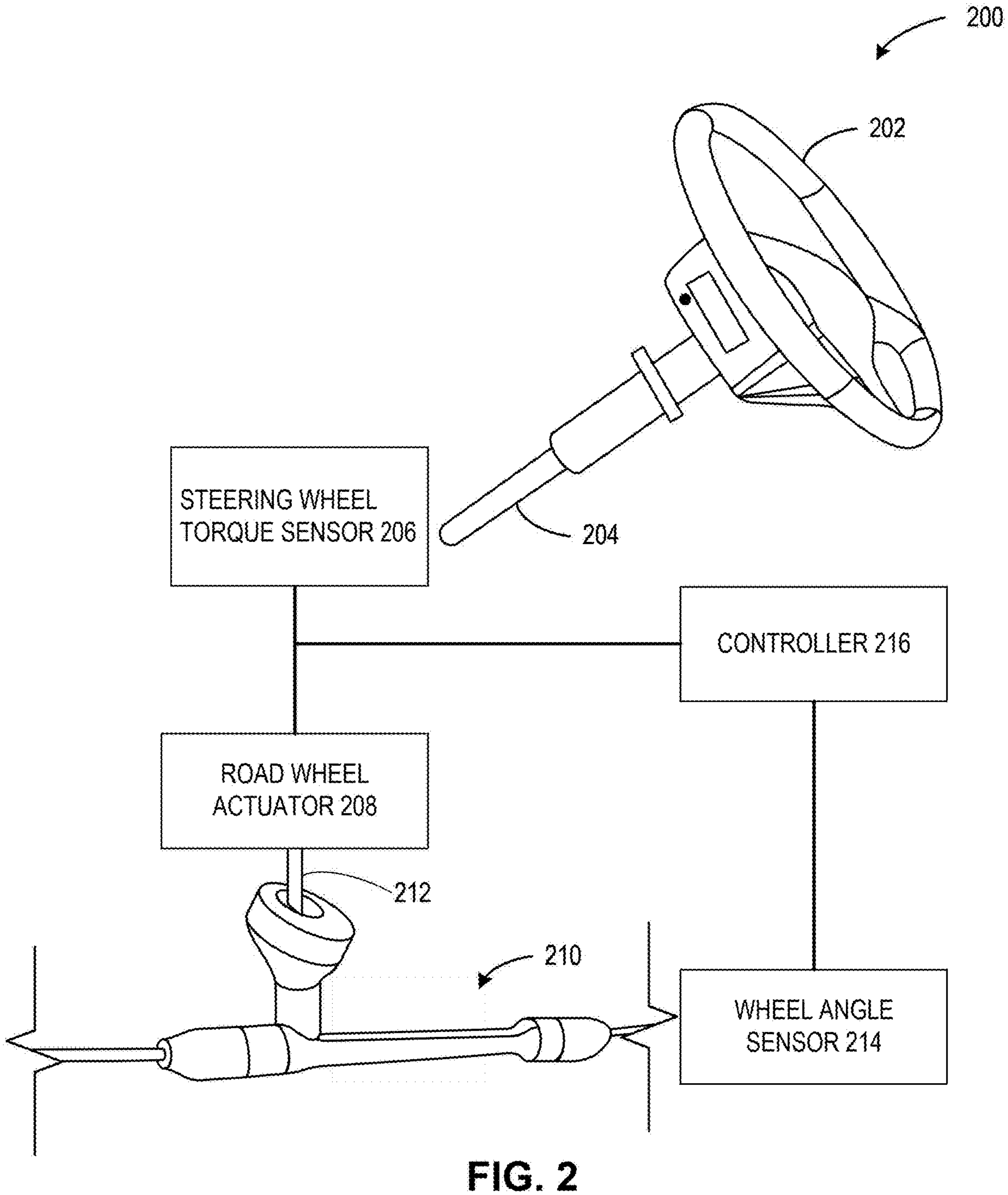
FIG. 2 illustrates an example steering system of the example vehicle of FIG. 1.

FIG. 2 illustrates an example steering system 200 that may be used to implement the steering system 109 of the example vehicle 100 of FIG. 1. In the illustrated example of FIG. 2, the steering system 200 includes a steering wheel 202, a steering wheel shaft 204, a steering wheel torque sensor 206, an RWA 208, a steering rack 210 (e.g., a steering rack and pinion system, a steering rack assembly, etc.), a steering input 212 (e.g. a steering shaft), a wheel angle sensor 214, and a controller 216. The example steering rack 210 is coupled to the front wheels 104*a*-104*b* of the vehicle 100 shown in FIG. 1.

The wheel angle sensor 214 determines a wheel angle of the vehicle 100 corresponding to an angular position of the front wheels 104*a*-104*b* of the vehicle 100. In some examples, the wheel angle sensor 214 can include one or more sensors to detect an angle of an individual wheel 104, or a plurality of wheels 104, relative to the vehicle 100. For example, optical encoders or hall effect sensors can be used to determine the wheel angle of the front wheels 104*a*-104*b*. Further, some examples may include cameras or computer vision to determine the wheel angle of the front wheels 104*a*-104*b*. In other examples, the wheel angle sensor 214 may be implemented on the steering rack 210 or the RWA 208 of the steering system 200 to determine a wheel angle of one or more of the wheels 104.

The steering wheel torque sensor 206 determines a commanded wheel angle corresponding to a torque applied to the steering wheel 202. In some examples, the steering wheel torque sensor 206 can include one or more sensors to detect an applied torque of the steering wheel 202. The steering wheel torque sensor 206 can include a strain gauge, a piezoelectric element, an optical sensor, a magnetoelastic sensor, etc. Including more than one steering wheel torque sensor 206 can increase overall performance of the steering system 200.

The controller 216 includes at least one processing unit configured to, at vehicle 100 startup, compare a commanded wheel angle to the road wheel angle. Based on a determination that the commanded wheel angle and road wheel angle are different, the controller 216 is configured to prevent motion of the vehicle 100. Preventing motion of the vehicle 100 may include preventing motion of the RWA 208 and preventing rotational movement of the wheels 104. Further, the controller 216 is configured to provide an indication of at least one of the wheel angle or the commanded wheel angle to the HMI 110 of the vehicle 100. For example, the HMI 110 may include two linearly arranged series of light emitting diodes (LEDs). The first series may represent the wheel angle, while the second series may represent the commanded wheel angle. If there is a difference between the wheel angle and the commanded wheel angle, the controller 216 may also cause the steering wheel 202 to vibrate.

The controller 216 is configured to enable motion of the vehicle 100 after a determination that the commanded wheel angle and the wheel angle are synchronized (e.g., caused to substantially match or become substantially equal). In one example, the user may apply a torque to the steering wheel 202 so that the commanded wheel angle and the wheel angle match. In another example, the user may depress a brake of the vehicle 100 and input a command to the controller 216 via the HMI 110 to synchronize the commanded wheel angle and wheel angle. In response to such a command, the controller 216 instructs the RWA 208 to cause the wheel angle to match the commanded wheel angle. After the wheel angle and the commanded wheel angle match, the controller 216 enables motion of the vehicle 100. Further, in some examples, after the controller 216 determines a difference between the wheel angle and the commanded wheel angle, the controller 216 may prompt the user to depress the brake and input a command to synchronize the commanded wheel angle and the wheel angle via the HMI 110.

In some examples, the controller 216 may be further configured to calibrate the wheel angle sensor 214 and the steering wheel torque sensor 206 at vehicle startup. For example, the controller 216 may compare sensor 206, 214 readings to expected values based on dynamic models or using self-calibration techniques. Further, calibrating the wheel angle sensor 214 can include an end-to-end calibration method by which the steering rack 210 is moved to its extreme positions (e.g. full left and full right) and recording the corresponding sensor 206, 214 outputs. Calibrating the wheel angle sensor 214 and the steering wheel torque sensor 206 may be accomplished through any suitable method.

Figure 3:
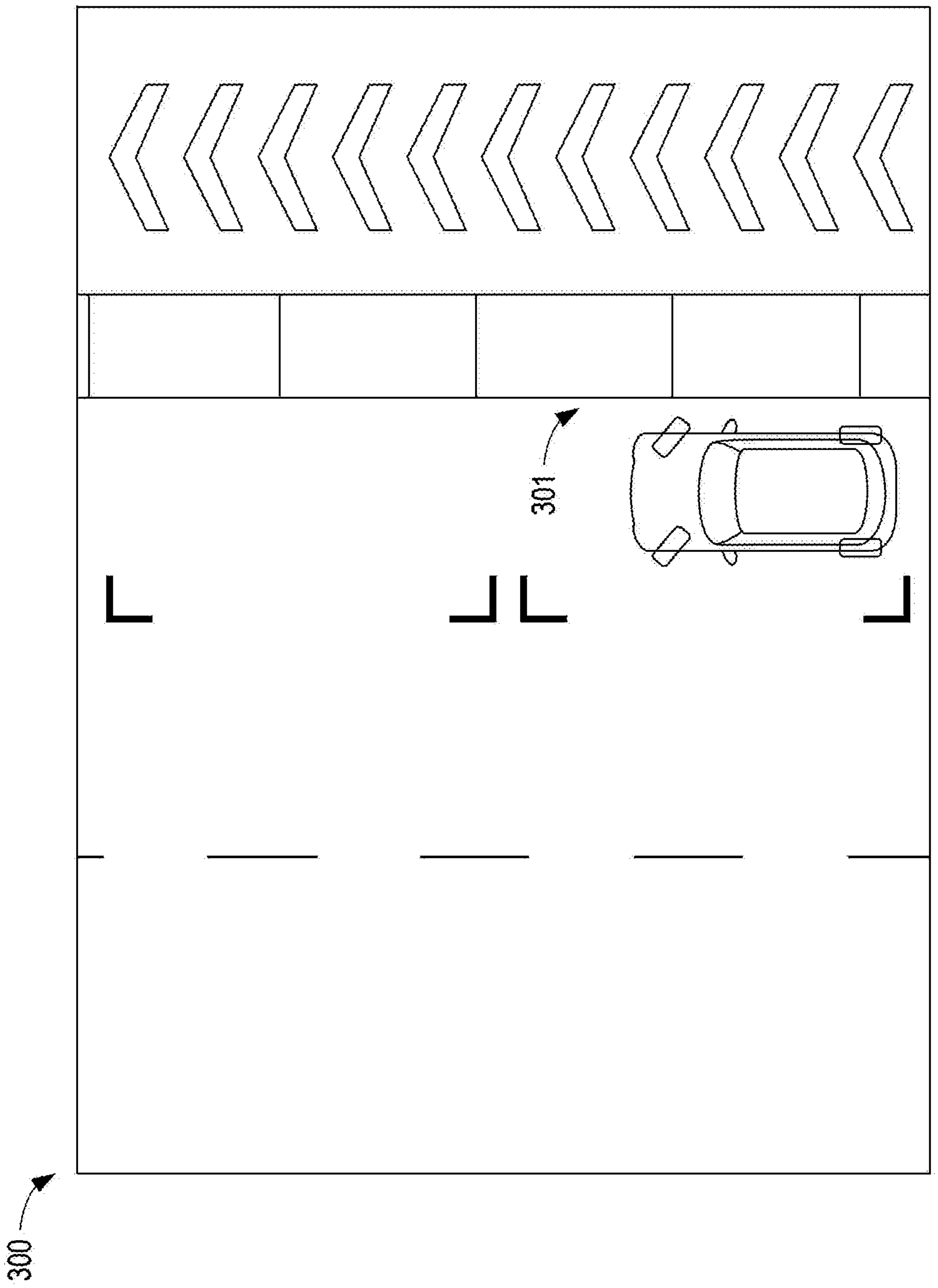
FIG. 3 illustrates an example environment in which the vehicle of FIG. 1 may operate.

FIG. 3 depicts an example environment 300 in which the vehicle 100 of FIG. 1 equipped with the steering system 200 of FIG. 2 may operate. In the illustrated example, a user may want to park the vehicle 100 on a hill. When the user parks the vehicle 100, they may apply torque to the steering wheel 202, which creates a commanded wheel angle to instructs the RWA 208 to turn the wheels 104 in a direction of a curb 301. The user then locks this position by providing input to the steering system 200 and powers down the vehicle 100. When the user powers on the vehicle 100 and the steering system 200, there may be a mismatch between the commanded steering angle and the wheel angle.

Figure 4A:
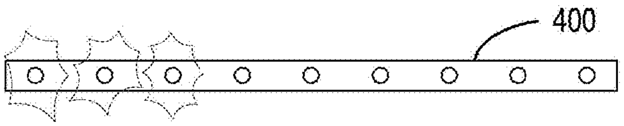
FIGS. 4A-4D depict interfaces that can be implemented in examples disclosed herein.

FIGS. 4A-4D depict example interfaces (e.g., HMIs) that can be implemented in examples disclosed herein. Turning to FIG. 4A, an example light array 400 is shown. According to examples disclosed herein, the light array 400 includes a linearly arranged array of light sources, such as LEDs for example. In the illustrated example of FIG. 4A, one or more of the light sources being illuminated indicates a wheel angle or a commanded wheel angle to a user. In other examples, a display panel (e.g., a screen, a monitor, a display panel, etc.) is utilized to indicate the wheel angle or commanded wheel angle to the user.

For example, a linearly arranged array of light sources may illuminate at least one light source to indicate the wheel angle or the commanded wheel angle to the user. In the example described, the illuminated light source corresponds to the wheel angle. If the wheel angle is fully turned to the left, a left most light source will illuminate, if the wheel angle is fully turned to the right, a right most light source will illuminate and so forth. A light source in the linearly arranged array of light sources may represent a specific number of degrees. For example, each light source may represent 3 degrees of wheel angle. In other examples, each light source may represent a different number of degrees of the wheel angle (e.g., 1, 2, 4, 5, etc.). In some examples, light sources may be illuminated with varying brightness to indicate that the wheel angle is a value that lies in between two light sources (e.g., if a light source represents 3 degrees of wheel angle and the wheel angle is 4 degrees two light sources may illuminate with varying brightness).

Figure 4B:
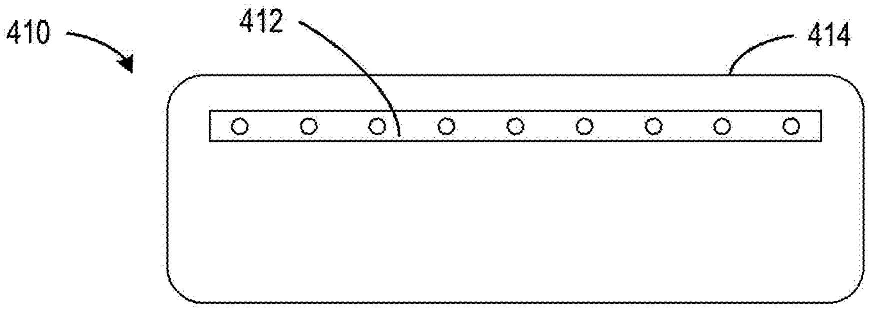

FIG. 4B depicts an example display (e.g., instrument panel, console display, etc.) 410 with a light array 412. According to examples disclosed herein, the light array 412 indicates a wheel angle or commanded wheel angle based on one or more light sources (e.g., display pixels) thereof being illuminated. For example, some of the light sources may be illuminated to indicate a degree to which the RWA has the wheels turned and/or rotated (e.g., a turning angle of wheels).

Figure 4C:
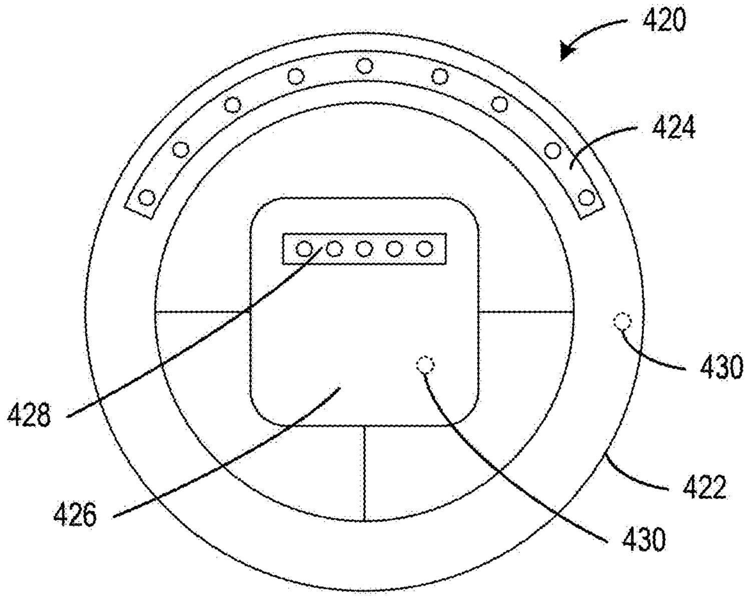

Turning to FIG. 4C, a steering wheel 420 is shown. In this example, a wheel portion 422 of the steering wheel 420 may have a light pattern array 424 for indication of a wheel angle or commanded wheel angle. Additionally or alternatively, a center portion 426 of the steering wheel 420 may include a light pattern array 428 for indication of the wheel angle or commanded wheel angle. In some examples, a button or switch 430 is implemented for the user to confirm or instruct synchronization of the wheel angle and commanded wheel angle.

Figure 4D:
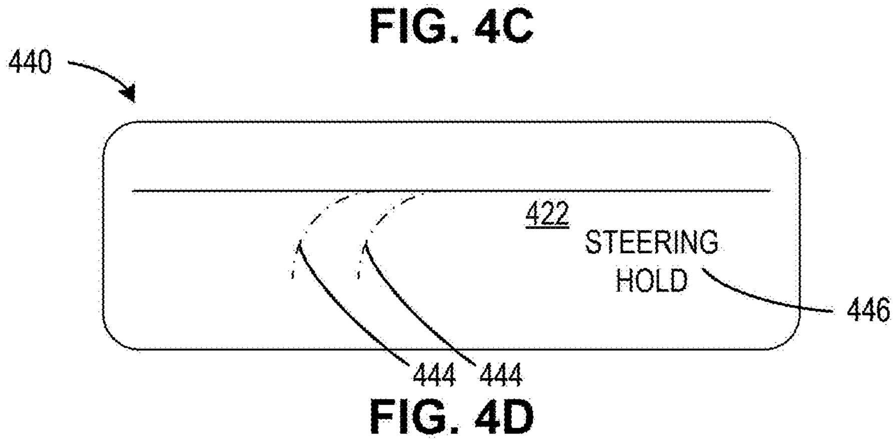

FIG. 4D depicts a display 440 that may project and/or display a scene (e.g., a scene captured by an image sensor) 442 with lines or curves 444 depicting a pathway of a vehicle based on a steering position. In some examples, text 446 may indicate that the wheel angle is being held even without an applied torque to the steering wheel. Any combination of aspects of the examples disclosed herein in FIGS. 4A-4D can be implemented in combination with one another.

Figure 5:
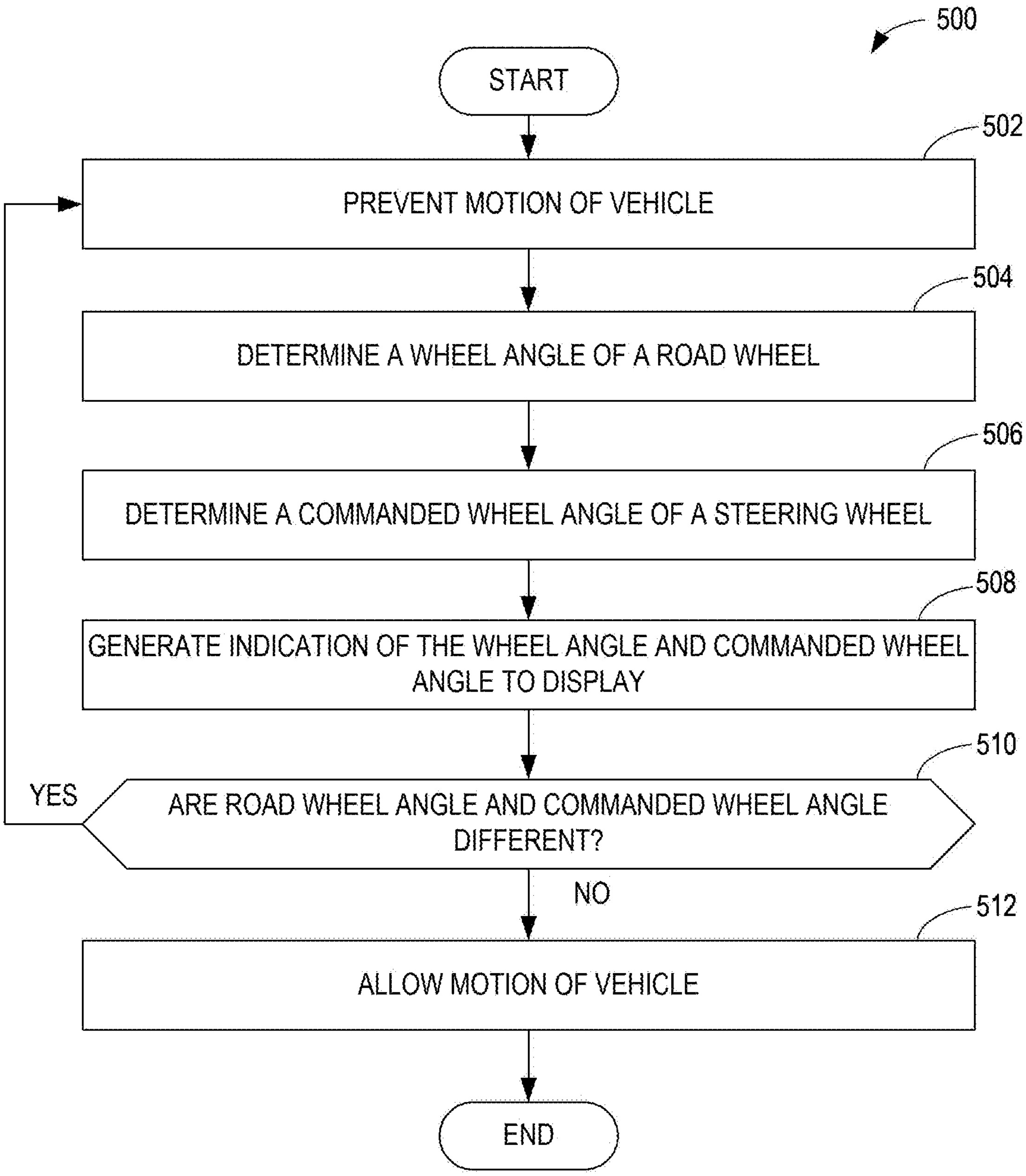
FIG. 5 is a flowchart representative of example machine readable instructions and/or example operations that may be executed, instantiated, and/or performed by example programmable circuitry to implement the steering controller of FIG. 1.

FIG. 5 is a flowchart representative of example machine readable instructions and/or example operations 500 that may be executed, instantiated, and/or performed by programmable circuitry to initialize a steering system of a vehicle, such as the example vehicle 100 and the steering system 200 of FIGS. 1 and 2. The example machine-readable instructions and/or the example operations 500 of FIG. 5 begin at block 502, at which the controller 216 prevents motion of the vehicle 100.

At block 504 the controller 216 determines a wheel angle of a wheel 104.

At block 506, the controller 216 determines the commanded wheel angle of the steering wheel 202 using the torque sensor 206.

At block 508, the controller 216 generates a notification of the road wheel angle and the commanded wheel angle to the HMI 110 (e.g. display).

At block 510, the controller 216 determines if the wheel angle and the commanded wheel angle are different. The controller 216 continuously monitors the wheel angle and the commanded wheel angle until they match before transitioning to block 512.

At block 512, the controller 216 enables motion of the vehicle.

Figure 6:
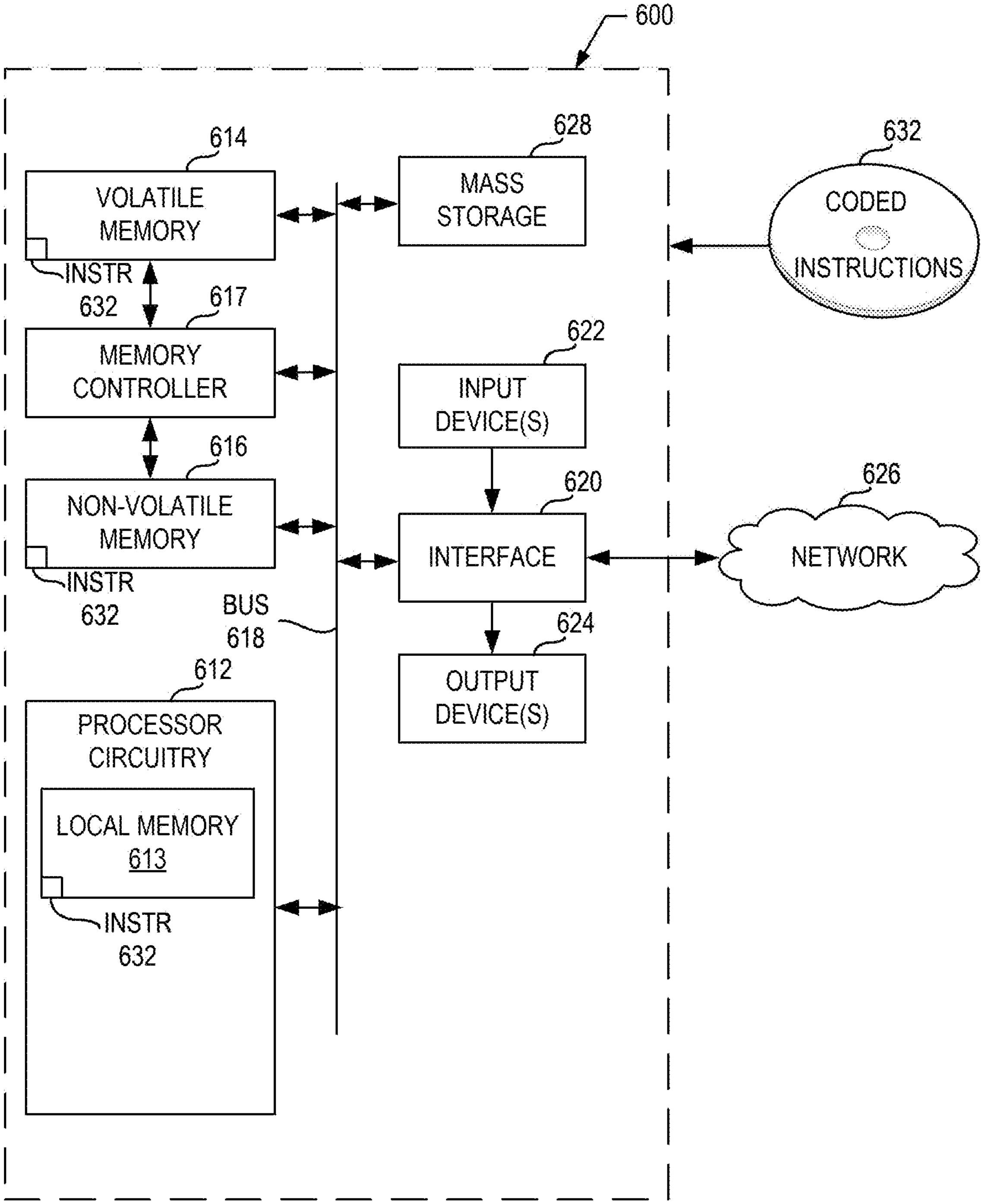
FIG. 6 is a block diagram of an example processing platform including programmable circuitry structured to execute, instantiate, and/or perform the example machine readable instructions and/or perform the example operations of FIG. 5 to implement the steering controller of FIG. 1.

FIG. 6 is a block diagram of an example programmable circuitry platform 600 structured to execute and/or instantiate the example machine-readable instructions and/or the example operations of FIG. 5 to implement the controller of FIG. 2. The programmable circuitry platform 600 can be, for example, a server, a personal computer, a workstation, a self-learning machine (e.g., a neural network), or any other type of computing and/or electronic device.

The programmable circuitry platform 600 of the illustrated example includes programmable circuitry 612. The programmable circuitry 612 of the illustrated example is hardware. For example, the programmable circuitry 612 can be implemented by one or more integrated circuits, logic circuits, FPGAs, microprocessors, CPUs, GPUs, DSPs, and/or microcontrollers from any desired family or manufacturer. The programmable circuitry 612 may be implemented by one or more semiconductor based (e.g., silicon based) devices. In this example, the programmable circuitry 612 implements the controller 216.

The programmable circuitry 612 of the illustrated example includes a local memory 613 (e.g., a cache, registers, etc.). The programmable circuitry 612 of the illustrated example is in communication with main memory 614, 616, which includes a volatile memory 614 and a non-volatile memory 616, by a bus 618. The volatile memory 614 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 616 may be implemented by flash memory and/or any other desired type of memory device. Access to the main memory 614, 616 of the illustrated example is controlled by a memory controller 617. In some examples, the memory controller 617 may be implemented by one or more integrated circuits, logic circuits, microcontrollers from any desired family or manufacturer, or any other type of circuitry to manage the flow of data going to and from the main memory 614, 616.

The programmable circuitry platform 600 of the illustrated example also includes interface circuitry 620. The interface circuitry 620 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 622 are connected to the interface circuitry 620. The input device(s) 622 permit(s) a user (e.g., a human user, a machine user, etc.) to enter data and/or commands into the programmable circuitry 612. The input device(s) 622 can be implemented by, for example, an audio sensor, a microphone, a camera (still or video), a keyboard, a button, a mouse, a touchscreen, a trackpad, and/or a voice recognition system.

One or more output devices 624 are also connected to the interface circuitry 620 of the illustrated example. The output device(s) 624 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, and/or speaker. The interface circuitry 620 of the illustrated example, thus, typically includes a graphics driver card, a graphics driver chip, and/or graphics processor circuitry such as a GPU.

The interface circuitry 620 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 626. The communication can be by, for example, an Ethernet connection, a digital subscriber line (DSL) connection, a telephone line connection, a coaxial cable system, a satellite system, a beyond-line-of-sight wireless system, a line-of-sight wireless system, a cellular telephone system, an optical connection, etc.

The programmable circuitry platform 600 of the illustrated example also includes one or more mass storage discs or devices 628 to store firmware, software, and/or data. Examples of such mass storage discs or devices 628 include magnetic storage devices (e.g., floppy disk, drives, HDDs, etc.), optical storage devices (e.g., Blu-ray disks, CDs, DVDs, etc.), RAID systems, and/or solid-state storage discs or devices such as flash memory devices and/or SSDs.

The machine-readable instructions 632, which may be implemented by the machine readable instructions of FIG. 5, may be stored in the mass storage device 628, in the volatile memory 614, in the non-volatile memory 616, and/or on at least one non-transitory computer readable storage medium such as a CD or DVD which may be removable.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities, etc., the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities, etc., the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified herein.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "programmable circuitry" is defined to include (i) one or more special purpose electrical circuits (e.g., an application specific circuit (ASIC)) structured to perform specific operation(s) and including one or more semiconductor-based logic devices (e.g., electrical hardware implemented by one or more transistors), and/or (ii) one or more general purpose semiconductor-based electrical circuits programmable with instructions to perform specific functions(s) and/or operation(s) and including one or more semiconductor-based logic devices (e.g., electrical hardware implemented by one or more transistors). Examples of programmable circuitry include programmable microprocessors such as Central Processor Units (CPUs) that may execute first instructions to perform one or more operations and/or functions, Field Programmable Gate Arrays (FPGAs) that may be programmed with second instructions to cause configuration and/or structuring of the FPGAs to instantiate one or more operations and/or functions corresponding to the first instructions, Graphics Processor Units (GPUs) that may execute first instructions to perform one or more operations and/or functions, Digital Signal Processors (DSPs) that may execute first instructions to perform one or more operations and/or functions, XPUs, Network Processing Units (NPUs) one or more microcontrollers that may execute first instructions to perform one or more operations and/or functions and/or integrated circuits such as Application Specific Integrated Circuits (ASICs). For example, an XPU may be implemented by a heterogeneous computing system including multiple types of programmable circuitry (e.g., one or more FPGAs, one or more CPUs, one or more GPUs, one or more NPUs, one or more DSPs, etc., and/or any combination(s) thereof), and orchestration technology (e.g., application programming interface(s) (API(s)) that may assign computing task(s) to whichever one(s) of the multiple types of programmable circuitry is/are suited and available to perform the computing task(s).

As used herein integrated circuit/circuitry is defined as one or more semiconductor packages containing one or more circuit elements such as transistors, capacitors, inductors, resistors, current paths, diodes, etc. For example an integrated circuit may be implemented as one or more of an ASIC, an FPGA, a chip, a microchip, programmable circuitry, a semiconductor substrate coupling multiple circuit elements, a system on chip (SoC), etc.

From the foregoing, it will be appreciated that example systems, apparatus, articles of manufacture, and methods have been disclosed that enable startup of steer-by-wire systems with spring-to-center steering wheels.

Example 1 is a vehicle control system includes a wheel angle sensor to determine a wheel angle of a road wheel of a vehicle, a steering wheel torque sensor to determine a commanded wheel angle of a steering wheel of the vehicle, and a controller with at least one processing unit configured to, at vehicle startup, compare the commanded wheel angle to the wheel angle, and based on a determination that the commanded wheel angle and the wheel angle are different, prevent motion of the vehicle.

Example 2 includes the vehicle control system of example 1, further comprising a display, and wherein the controller is further configured to provide an indication of at least one of the wheel angle or the commanded wheel angle via the display.

Example 3 includes the vehicle control system of example 2, wherein the display includes a series of light emitting diodes.

Example 4 includes the vehicle control system of example 1, wherein the controller is further configured to enable motion of the vehicle in response to a determination that the commanded wheel angle and the wheel angle are synchronized.

Example 5 includes the vehicle control system of example 1, wherein the commanded wheel angle and the wheel angle are synchronized in response to a torque applied to the steering wheel.

Example 6 includes the vehicle control system of example 1, wherein the controller is further configured to after determining that the commanded wheel angle and the wheel angle are different, prompt a user to synchronize the commanded wheel angle and the wheel angle.

Example 7 includes the vehicle control system of example 1, wherein preventing motion of the vehicle includes preventing a change of the wheel angle and preventing rotational motion of the road wheel of the vehicle.

Example 8 includes the vehicle control system of example 1, wherein the wheel angle sensor is a first wheel angle sensor and further including a second wheel angle sensor.

Example 9 includes the vehicle control system of example 1, wherein the controller is further configured to calibrate the wheel angle sensor and the steering wheel torque sensor at vehicle startup.

Example 10 includes the vehicle control system of example 1, wherein the controller is further configured to cause the steering wheel to vibrate based on a determination that the wheel angle and the commanded wheel angle are different.

Example 11 includes a steering control system for a vehicle including a steering motor operatively coupled to a steering motor position sensor to determine a steering motor position, a steering wheel operatively coupled to a steering wheel torque sensor to determine a commanded steering motor position, and at least one processor configured to provide an indication of the steering motor position and the commanded steering motor position to a display, on startup, compare the steering motor position and the commanded steering motor position, based on a determination that the steering motor position and the commanded steering motor position are different, prevent motion of the vehicle, and generate a request to synchronize the commanded steering motor position and the steering motor position, and based on an input, synchronize the commanded steering motor position and the steering motor position and enable motion of the vehicle.

Example 12 includes the steering control system of example 11, wherein the display includes a series of linearly arranged light emitting diodes.

Example 13 includes the steering control system of example 11, wherein preventing motion of the vehicle includes preventing motion of the steering motor and preventing rotational motion of road wheels of the vehicle.

Example 14 includes the steering control system of example 11, wherein the at least one processing unit is further configured to calibrate the steering motor position sensor and the steering wheel torque sensor at startup.

Example 15 includes the steering control system of example 11, wherein the at least one processing unit is further configured to command a vibration motor of the steering wheel to vibrate based on a determination that the steering motor position and the commanded steering motor position are different.

Example 16 is a method for an electronic steering system including determining a wheel angle of a road wheel, determining a commanded wheel angle of a steering wheel using a torque sensor, generating a notification of the wheel angle and the commanded wheel angle to a display, and comparing the wheel angle and the commanded wheel angle, wherein if the wheel angle and the commanded wheel angle are different, preventing motion of a vehicle.

Example 17 includes the method of example 16, wherein the display includes a series of linearly arranged light emitting diodes.

Example 18 includes the method of example 16, wherein after determining that the commanded wheel angle and the wheel angle are different, prompt the display with a request to synchronize the commanded wheel angle and the wheel angle.

Example 19 includes the method of example 18, wherein in response to the request to synchronize the wheel angle and the commanded wheel angle, automatically change the wheel angle to match the commanded wheel angle.

Example 20 includes the method of example 16, wherein preventing motion of the vehicle includes preventing a change of the wheel angle and preventing rotational motion of the road wheel of the vehicle.

The following claims are hereby incorporated into this Detailed Description by this reference. Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent.

What is claimed is:

1. A vehicle control system comprising:

a wheel angle sensor to determine a wheel angle of a road wheel of a vehicle;

a steering wheel torque sensor to determine a commanded wheel angle of a steering wheel of the vehicle; and a controller with at least one processing unit configured to:

at vehicle startup, compare the commanded wheel angle to the wheel angle; and based on a determination that the commanded wheel angle and the wheel angle are different, prevent motion of the vehicle.

2. The vehicle control system of claim 1, further comprising a display, and wherein the controller is further configured to provide an indication of at least one of the wheel angle or the commanded wheel angle via the display.

3. The vehicle control system of claim 2, wherein the display includes a series of light emitting diodes.

4. The vehicle control system of claim 1, wherein the controller is further configured to enable motion of the vehicle in response to a determination that the commanded wheel angle and the wheel angle are synchronized.

5. The vehicle control system of claim 1, wherein the commanded wheel angle and the wheel angle are synchronized in response to a torque applied to the steering wheel.

6. The vehicle control system of claim 1, wherein the controller is further configured to after determining that the commanded wheel angle and the wheel angle are different, prompt a user to synchronize the commanded wheel angle and the wheel angle.

7. The vehicle control system of claim 1, wherein preventing motion of the vehicle includes preventing a change of the wheel angle and preventing rotational motion of the road wheel of the vehicle.

8. The vehicle control system of claim 1, wherein the wheel angle sensor is a first wheel angle sensor and further including a second wheel angle sensor.

9. The vehicle control system of claim 1, wherein the controller is further configured to calibrate the wheel angle sensor and the steering wheel torque sensor at vehicle startup.

10. The vehicle control system of claim 1, wherein the controller is further configured to cause the steering wheel to vibrate based on a determination that the wheel angle and the commanded wheel angle are different.

11. A steering control system for a vehicle comprising:

a steering motor operatively coupled to a steering motor position sensor to determine a steering motor position;

a steering wheel operatively coupled to a steering wheel torque sensor to determine a commanded steering motor position; and at least one processing unit configured to:

provide an indication of the steering motor position and the commanded steering motor position to a display;

on startup, compare the steering motor position and the commanded steering motor position;

based on a determination that the steering motor position and the commanded steering motor position are different, prevent motion of the vehicle, and generate a request to synchronize the commanded steering motor position and the steering motor position; and based on an input, synchronize the commanded steering motor position and the steering motor position and enable motion of the vehicle.

12. The steering control system of claim 11, wherein the display including a series of linearly arranged light emitting diodes.

13. The steering control system of claim 11, wherein preventing motion of the vehicle includes preventing motion of the steering motor and preventing rotational motion of road wheels of the vehicle.

14. The steering control system of claim 11, wherein the at least one processing unit is further configured to calibrate the steering motor position sensor and the steering wheel torque sensor at startup.

15. The steering control system of claim 11, wherein the at least one processing unit is further configured to command a vibration motor of the steering wheel to vibrate based on a determination that the steering motor position and the commanded steering motor position are different.

16. A method for an electronic steering system comprising:

determining a wheel angle of a road wheel;

determining a commanded wheel angle of a steering wheel using a torque sensor;

generating a notification of the wheel angle and the commanded wheel angle to a display; and comparing the wheel angle and the commanded wheel angle, wherein if the wheel angle and the commanded wheel angle are different, preventing motion of a vehicle.

17. The method of claim 16, wherein the display includes a series of linearly arranged light emitting diodes.

18. The method of claim 16, wherein after determining that the commanded wheel angle and the wheel angle are different, prompt the display with a request to synchronize the commanded wheel angle and the wheel angle.

19. The method of claim 18, wherein in response to the request to synchronize the wheel angle and the commanded wheel angle, automatically change the wheel angle to match the commanded wheel angle.

20. The method of claim 16, wherein preventing motion of the vehicle includes preventing a change of the wheel angle and preventing rotational motion of the road wheel of the vehicle.

* * * * *